3,560,547
CHLOROCARBONATE PREPARATION

Marion E. Hill, Palo Alto, Calif., assignor to the United States of America as represented by the Secretary of the Navy
No Drawing. Filed Sept. 19, 1961, Ser. No. 139,582
Int. Cl. C07c 69/00
U.S. Cl. 260—463       10 Claims The invention described herein may be manufactured and used by or for the Government of the United States of America for governmental purposes without the payment of any royalties thereon or therefor.

This invention relates to a process for the production of highly nitrated organic compounds. More specifically, it relates to the preparation of chlorocarbonates which are negatively substituted in the beta carbon atom; still more specifically it relates to the preparation of chlorocarbonate of nitroalkanols and halonitroalkanols.

It has long been known that chlorocarbonates can be prepared by the reaction of phosgene, $COCl_2$, and an alcohol by the general reaction:

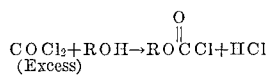
(Excess)

The chemical unreactivity of polynitroalcohols and other negatively substituted alcohols make the normal utilization of this reaction almost impossible. Catalysts such as aluminum chloride are employed to promote the reaction and such a system has been described for the preparation of bis(trinitroethyl) carbonate which was disclosed in application Ser. No. 616,579, filed Oct. 17, 1956, and now abandoned. However, for successful use of phosgene and a catalyst it is necessary to enclose the components in a pressure vessel and heat for several hours to obtain the chlorocarbonate. Such a procedure which involves having an explosive ingredient mixed with a poisonous gas under pressure and being heated at the same time is unattractive.

It is therefore an object of this invention to provide a means of preparing chlorocarbonates negatively substituted in the beta carbon atom which employs mild conditions, avoids the use of a pressure vessel, and in which the presence of phosgene is minimized.

Another object of this invention is to provide a novel catalytic method for preparing such chlorocarbonates.

Still another object of this invention is to provide a method having the foregoing advantages which employ simple apparatus and low cost starting materials.

Still another object is to provide a method having the foregoing advantages which allow a great saving in time.

Other objects and many of the attendant advantages of this invention will be readily appreciated as the same becomes better understood by reference to the following detailed description when considered in connection with the accompanying drawings wherein:

According to this invention, chlorocarbonates negatively substituted in the beta carbon atom are prepared simply by adding water to a mixture of a ferric chloride catalyst and a solution of a nitroalcohol in carbon tetrachloride at the reflux temperature of the carbon tetrachloride. In this reaction part of the halogens of the carbon tetrachloride are removed and an ensuing condensation of the intermediates with the nitroalcohol gives the chlorocarbonate in good yield. The reaction also produces the gaseous products phosgene and hydrogen chloride which are carried out to traps and decomposed.

The chlorocarbonate product is isolated by decantation of the reaction solution from the catalyst, clarifying this solution and removing any unreacted alcohol. Distillation of the solvent under reduced pressure leaves the chlorocarbonate in almost pure condition.

It is not necessary, however, to isolate the chlorocarbonate for many uses, in which case the chlorocarbonate is simply left in solution in the solvent in which it was made. A great advantage is gained in labor because only decantation of the reaction solution from the catalyst is necessary before subsequent reactions involving the chlorocarbonate are carried out with other compounds.

After removal of any unreacted alcohol, the final solution consists of the chlorocarbonate in carbon tetrachloride solution and may be used directly to react with alcohols, amines, or other reactants which will condense with acid chlorides. The chlorocarbonate may be reacted in situ with additional nitroalcohol to prepare bis (trinitroethyl) carbonate, the usefulness of which is described in the aforementioned application.

The amount of water added to the reaction mixture is critical. Too much water stops the reaction, but permitting the reaction system to become anhydrous causes the formation of a side product, trinitro-ethylorthocarbonate. On a one-half mole scale using an equal weight of ferric chloride catalyst, an additional rate of about 4 to about 6 ml. of water per hour is suitable. This rate, however, may be varied according to the amount of ferric chloride and carbon tetrachloride used.

The water need not be added directly to the reaction mixture, but it may be introduced in the form of a hydrate of ferric chloride, for instance, $FeCl_3 \times 4H_2O$.

After the addition of water is complete the system may be dried by the side reaction of water with carbon tetrachloride by simply continuing the reflux period for a short time. This procedure allows the catalyst to be reused and saves the expense of replacing the catalyst for each run. The foregoing procedure must be modified when using a fluorinated nitroalcohol as the primary reactant. In order to circumvent orthocarbonate formation it is necessary to add the fluorinated nitroalcohol and water simultaneously to already partially hydrated ferric chloride in wet carbon tetrachloride.

Following are several actual examples which are given for the purpose of being illustrative of the process and are not limited to the specified conditions and procedures therein.

EXAMPLE I 2,2,2-trinitroethylchlorocarbonate. A mixture of 90.5 grams (0.5 mole) of trinitroethyl alcohol, 100 grams of anhydrous ferric chloride and 200 ml. of carbon tetrachloride was placed in a 500 ml. three-neck, round bottom flask fitted with a mechanical stirrer, graduated dropping funnel, and reflux condenser connected to a methanol trap. The flask was heated to reflux temperature with a Glascol mantle and then water was added dropwise to keep the ferric chloride partially hydrated, two drops per minute for the first thirty minutes and then five to six drops per minute or six ml. during the first hour. Heating, stirring, and the addition of water was continued for five hours, then heating and stirring for one hour. The reaction mixture was then allowed to cool partially and the carbon tetrachloride solution was decanted from the ferric chloride, combined with three 25 ml. carbon tetrachloride washings of the ferric chloride, clarified with Norite (activated charcoal) and Celite (a diatomaceous earth) and chilled. Unreacted alcohol which precipitated out was filtered off. About 30 grams were obtained.

The chlorocarbonate was identified by converting it to bis(trinitroethyl) carbonate. Assuming 60 grams of trinitroethanol had reacted to form trinitroethyl chlorocarbonate, an equivalent weight of trinitroethanol, 60 grams, was added to the carbon tetrachloride solution. This solution, 400 ml., with 4 ml. antimony pentachloride added, was refluxed, with magnetic stirring, in a 1 l. round bottom flask for forty-eight hours. The crystalline product which formed was filtered off and recrystallized from methylene chloride and hexane. The recrystallized product weighed 105 grams, at a melting point of 115 to 117° C., and proved to be bis(trinitroethyl) carbonate.

The chlorocarbonate preparation was repeated as above, except that the product was converted by reaction with methanol to methyl trinitroethyl carbonate, whose identity was proven by comparison with known methyl trinitroethyl carbonate synthesized indendently.

EXAMPLE II 2-fluoro-2,2-dinitroethanol was substituted for the trinitroethyl alcohol of Example I. The essential procedure of Example I is followed except care must be taken to add the fluoronitroalcohol and water simultaneously to already partially hydrated ferric chloride in wet carbon tetrachloride in order to prevent orthocarbonate formation. The chlorocarbonate reaction product was identified by the same techniques as in Example I.

The advantages of this process over prior processes are the elimination of the need for an enclosed system, the employment of ordinary reflux apparatus, and the use of mild conditions and easily carried out procedure.

What is claimed as new and desired to be secured by Letters Patent of the United States is:

1. The process of preparing chlorocarbonates of alkanols substituted in the beta carbon atom by a substituent selected from the group consisting of nitro, and fluoro and nitro groups which comprises: preparing a solution of said alkanol in carbon tetrachloride; heating said solution to the reflux temperature of the carbon tetrachloride in the presence of a ferric chloride catalyst which is at least partially hydrated; and maintaining said temperature whereby the chlorocarbonate of said alkanol is formed.

2. The process of preparing chlorocarbonates of alkanols nitro substituted in the beta carbon atom which comprises: preparing a solution of the alcohol, which is substituted in the beta carbon atom with a nitro group, in carbon tetrachloride; heating the solution to the reflux temperature of the carbon tetrachloride in the presence of at least partially hydrated ferric chloride catalyst; and maintaining the said temperature whereby the corresponding chlorocarbonate is formed.

3. The process of claim 2 in which water is added in small aliquots at the rate of about 4–6 milliliters per hour per one-half mole of alcohol originally present continually during the reaction to restore the hydration of the catalyst.

4. The process of claim 2 in which the ferric chloride is initially anhydrous and water is added continually in small aliquots at the rate of about 4–6 milliliters per hour per one-half mole of alcohol originally present at least sufficient to keep the ferric chloride partially hydrated.

5. The process of claim 4 which includes the additional steps of decanting the reaction solution from the ferric chloride; clarifying the solution; chilling the solution sufficiently to precipitate any of said unreacted alkanol; and distilling off the carbon tetrachloride, whereby the chlorocarbonate is left in substantially pure condition.

6. The process of claim 2 in which substantially equal weights of said alkanol and anhydrous ferric chloride catalyst are employed and water is added continually in small aliquots at the rate of about 4–6 milliliters per hour per one-half mole of alcohol originally present.

7. The process of claim 2 wherein said alkanol is trinitroethanol.

8. The process of preparing chlorocarbonates of alkanol substituted in the beta carbon atom with nitro and fluoro-groups which comprises adding a mixture of the alcohol, substituted in the beta carbon atom with nitro- and fluoro-groups, and water to carbon tetrachloride; heating the mixture to the reflux temperature of the carbon tetrachloride in the presence of at least partially hydrated ferric chloride catalyst; and maintaining said temperature, whereby the corresponding chlorocarbonate is formed.

9. The process of claim 8 which includes the additional steps of decanting the reaction solution from the ferric chloride; clarifying the solution; chilling the solution sufficiently to precipitate any of said unreacted alkanol; and distilling off the carbon tetrachloride, whereby the chlorocarbonate is left in substantially pure condition.

10. The process of claim 8 wherein said alkanol is 2-fluoro-2,2-dinitroethanol.

References Cited

UNITED STATES PATENTS

| 2,476,627 | 7/1949 | Strain et al. | 260—463 |
| 2,787,630 | 4/1957 | Katz et al. | 260—463 |
| 3,008,978 | 11/1961 | Brotherton et al. | 260—463 |

OTHER REFERENCES

Hill, J. Org. Chem., vol. 25, pp. 1115–1118, (1960), QD 241 JC.

LELAND A. SEBASTIAN, Primary Examiner

U.S. Cl. X.R.

252—441; 260—632, 704, 708